United States Patent
Oh (10) Patent No.: US 10,078,899 B2
(45) Date of Patent: Sep. 18, 2018

(54) CAMERA SYSTEM AND IMAGE REGISTRATION METHOD THEREOF

(71) Applicant: Hanwha Techwin Co., Ltd., Changwon-si (KR)

(72) Inventor: Jaeyoon Oh, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 241 days.

(21) Appl. No.: 14/882,870

(22) Filed: Oct. 14, 2015

(65) Prior Publication Data
US 2016/0125585 A1 May 5, 2016

(30) Foreign Application Priority Data
Nov. 3, 2014 (KR) .......................... 10-2014-0151584

(51) Int. Cl.
| | |
|---|---|
| *G06T 7/00* | (2017.01) |
| *H04N 13/02* | (2006.01) |
| *H04N 5/232* | (2006.01) |
| *H04N 5/225* | (2006.01) |
| *H04N 13/00* | (2018.01) |

(Continued)

(52) U.S. Cl.
CPC ................ *G06T 7/003* (2013.01); *G06T 7/33* (2017.01); *G06T 7/337* (2017.01); *H04N 5/2258* (2013.01); *H04N 5/232* (2013.01); *H04N 5/23296* (2013.01); *H04N 13/0025* (2013.01); *H04N 13/0239* (2013.01); *H04N 13/0296* (2013.01); *G06T 2207/10012* (2013.01); *G06T 2207/10048* (2013.01); *H04N 5/332* (2013.01)

(58) Field of Classification Search
CPC ........... G06T 7/003; G06T 7/337; G06T 7/33; G06T 2207/10048; G06T 2207/10012; H04N 13/0025; H04N 5/2258; H04N 13/0239; H04N 5/232; H04N 5/23296; H04N 13/0296; H04N 5/332; G06K 9/6201

See application file for complete search history.

(56) References Cited

U.S. PATENT DOCUMENTS

2003/0185340 A1* 10/2003 Frantz ................ G01N 21/8806
378/57
2004/0189674 A1* 9/2004 Zhang ...................... H04N 1/04
345/629

(Continued)

FOREIGN PATENT DOCUMENTS

JP             4075892 B2    4/2008
KR      1020050063991 A     6/2005
(Continued)

*Primary Examiner* — Joseph Suh
(74) *Attorney, Agent, or Firm* — Sughrue Mion, PLLC (57) ABSTRACT

Provided are a camera system and an image registration method for registering images taken by multiple cameras moving in the same manner. The image registration method includes: acquiring multiple sets of images of a reference subject, wherein each of the multiple sets of images comprises images taken by the multiple cameras facing a same direction and images of different sets are taken with the multiple cameras facing different directions; performing image registration using the multiple sets of images; and rendering a result image showing a result of the image registration.

8 Claims, 9 Drawing Sheets

(51) Int. Cl.
*G06T 7/33* (2017.01)
*H04N 5/33* (2006.01)

(56) References Cited

U.S. PATENT DOCUMENTS

| | | | | |
|---|---|---|---|---|
| 2005/0110869 A1* | 5/2005 | Tillotson | ................ | H04N 7/181 |
| | | | | 348/113 |
| 2005/0148859 A1* | 7/2005 | Miga | ........................ | G06T 7/38 |
| | | | | 600/410 |
| 2006/0249679 A1* | 11/2006 | Johnson | .................... | G01C 3/08 |
| | | | | 250/332 |
| 2007/0014347 A1* | 1/2007 | Prechtl | .................... | H04N 5/232 |
| | | | | 375/240.01 |
| 2007/0201744 A1* | 8/2007 | Sanami | ................ | H04N 1/3935 |
| | | | | 382/173 |
| 2008/0069405 A1* | 3/2008 | Endo | .................... | G01B 11/002 |
| | | | | 382/106 |
| 2010/0302366 A1* | 12/2010 | Zhao | .................. | B23Q 17/2233 |
| | | | | 348/142 |
| 2010/0328456 A1* | 12/2010 | Alakarhu | ................ | G01C 3/08 |
| | | | | 348/139 |
| 2011/0044504 A1* | 2/2011 | Oi | .............................. | G06T 7/73 |
| | | | | 382/103 |
| 2011/0115615 A1* | 5/2011 | Luo | .......................... | B60R 1/00 |
| | | | | 340/436 |
| 2011/0173565 A1* | 7/2011 | Ofek | ......................... | G06T 5/50 |
| | | | | 715/790 |
| 2012/0019614 A1* | 1/2012 | Murray | .............. | H04N 13/0007 |
| | | | | 348/36 |
| 2012/0045099 A1* | 2/2012 | Ishioka | ............... | G06K 9/00362 |
| | | | | 382/106 |
| 2012/0120264 A1* | 5/2012 | Lee | ........................... | G06T 7/20 |
| | | | | 348/208.4 |
| 2012/0182415 A1 | 7/2012 | Toyoda et al. | | |
| 2013/0004021 A1* | 1/2013 | Nagaoka | ................... | B60R 1/00 |
| | | | | 382/103 |
| 2013/0050453 A1* | 2/2013 | Bergstrom | ........... | H04N 5/2258 |
| | | | | 348/61 |
| 2013/0070108 A1* | 3/2013 | Aerts | .................... | F01D 21/003 |
| | | | | 348/187 |
| 2013/0182080 A1* | 7/2013 | Lin | .................... | H04N 13/0239 |
| | | | | 348/47 |
| 2014/0036085 A1* | 2/2014 | Avignon | ................ | G01S 13/04 |
| | | | | 348/153 |

FOREIGN PATENT DOCUMENTS

| | | |
|---|---|---|
| KR | 1020100008886 A | 1/2010 |
| KR | 1020120062873 A | 6/2012 |
| KR | 101323141 B1 | 10/2013 |
| WO | 2004038661 A1 | 5/2004 |

\* cited by examiner

CAMERA SYSTEM AND IMAGE REGISTRATION METHOD THEREOF

CROSS-REFERENCE TO RELATED APPLICATION

This application claims priority from Korean Patent Application No. 10-2014-0151584, filed on Nov. 3, 2014, in the Korean Intellectual Property Office, the disclosure of which is incorporated herein in its entirety by reference.

BACKGROUND

1. Field

Methods and apparatuses consistent with exemplary embodiments relate to camera systems and image registration methods thereof.

2. Description of the Related Art

Recently, extensive research has been conducted on complementary information fusion methods using two or more sensors to improve the accuracy and reliability of image processing algorithms, such as change detection, motion detection, super-resolution image restoration and object recognition/tracking, which are used in many technical applications, e.g., monitoring systems and medical imaging systems.

SUMMARY

One or more exemplary embodiments provide a method of performing image registration more easily and accurately in a multi-camera system, e.g., a stereo camera system, which is mounted with multiple cameras in an integrated manner such that the multiple cameras move, e.g., pan or tilt, in the same manner.

Various aspects of the inventive concept will be set forth in part in the description which follows and, in part, will be apparent from the description, or may be learned by practice of the presented embodiments.

According to an exemplary embodiment, there is provided an image registration method performed by a processor to register images taken by multiple cameras moving in the same manner, the image registration method including: acquiring multiple sets of images of a reference subject, wherein each of the multiple sets of images comprises images taken by the multiple cameras facing a same direction and images of different sets are taken with the multiple cameras facing different directions; performing image registration using the multiple sets of images; and rendering a result image showing a result of the image registration.

The performing the image registration may include: generating a reference image for each of the multiple cameras by synthesizing images which are selected from the multiple sets of images and taken by a same camera; and estimating a conversion model by matching corresponding feature points matching between reference images including the reference image.

Each of the multiple sets of images may include two images showing different wavelength characteristics of the reference subject.

The performing of the image registration may include: generating feature point images by masking regions outside the reference subject in the multiple sets of images; and generating a reference image for each of the multiple cameras by synthesizing images which are selected from the feature point images and taken by a same camera.

According to another aspect of an exemplary embodiment, there is provided an image registration method performed by a processor to register images taken by multiple cameras moving in the same manner, the image registration method including: comparing a viewing angle of a first camera with a viewing angle of a second camera; performing image registration according to a first registration algorithm when a difference between the viewing angle of the first camera and the viewing angle of the second camera is greater than a reference value, and performing image registration according to a second registration algorithm different from the first registration algorithm when the difference between the viewing angle of the first camera and the viewing angle of the second camera is less than or equal to the reference value; and rendering a result image showing a result of the image registration performed according to the first registration algorithm or the second registration algorithm.

The performing the image registration according to the first registration algorithm may include: acquiring multiple sets of images of a reference subject, wherein each of the multiple sets includes images taken by the multiple cameras facing a same direction and images of different sets are taken with the multiple cameras facing different directions; and performing image registration using the multiple sets of images.

The performing of the image registration may include: generating a reference image for each of the multiple cameras by synthesizing images which are selected from the multiple sets of images and taken by a same camera; and estimating a conversion model by matching corresponding feature points matching between reference images including the reference image.

A center coordinate of the reference subject in the reference image may be used as a coordinate of a feature point of the reference image.

The performing of the image registration may include: generating feature point images by masking regions outside the reference subject in the multiple sets of images; and generating a reference image for each of the multiple cameras by synthesizing images which are selected from the feature point images and taken by a same camera.

The performing the image registration according to the second registration algorithm may include: acquiring multiple images of a reference subject, each of which being taken by each of the multiple cameras facing a same direction; and estimating a conversion model by matching corresponding feature points between the multiple images.

According to another aspect of an exemplary embodiment, there is provided a camera system including: multiple cameras configured to move in the same manner; and a controller configured to acquire multiple sets of images of a reference subject, perform image registration using the multiple sets of images, and perform rendering of a result image showing a result of the image registration, wherein each of the multiple sets includes images taken by the multiple cameras facing a same direction and images of different sets are taken with the multiple cameras facing different directions The controller may be further configured to generate a reference image for each of the multiple cameras by synthesizing images which are selected from the multiple sets of images and taken by a same camera, and estimate a conversion model by matching corresponding feature points matching between reference images including the reference image.

A center coordinate of the reference subject in the reference image may be used as a coordinate of a feature point of the reference image.

The controller may be further configured to generate feature point images by masking regions outside the reference subject in the multiple sets of images, and generate a reference image for each of the multiple cameras by synthesizing images which are selected from the feature point images and taken by a same camera.

According to another aspect of an exemplary embodiment, there is provided a camera system including: multiple cameras configured to move in the same manner; and a controller configured to compare a viewing angle of a first camera with a viewing angle of a second camera, perform image registration according to a first registration algorithm when a difference between the viewing angle of the first camera and the viewing angle of the second camera is greater than a reference value, perform image registration according to a second registration algorithm different from the first registration algorithm when the difference between the viewing angle of the first camera and the viewing angle of the second camera is less than or equal to the reference value, and perform rendering of a result image showing a result of the image registration performed according to the first registration algorithm or the second registration algorithm.

The controller may be further configured to acquire multiple sets of images of a reference subject, and perform image registration using the multiple sets of images, wherein each of the multiple sets includes images taken by the multiple cameras facing a same direction and images of different sets are taken with the multiple cameras facing different directions.

The controller may be further configured to generate a reference image for each of the multiple cameras by synthesizing images which are selected from the multiple sets of images and taken by a same camera, and estimate a conversion model by matching corresponding feature points matching between reference images including the reference image.

A center coordinate of the reference subject in the reference image may be used as a coordinate of a feature point of the reference image.

The controller may be further configured to generate feature point images by masking regions outside the reference subject in the multiple sets of images, and generate a reference image for each of the multiple cameras by synthesizing images which are selected from the feature point images and taken by a same camera.

The controller may be further configured to acquire multiple images of a reference subject, each of which being taken by each of the multiple cameras facing a same direction, and estimate a conversion model by matching corresponding feature points between the multiple images.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF THE EXEMPLARY EMBODIMENTS

Reference will now be made in detail to exemplary embodiments, aspects of which are illustrated in the accompanying drawings, wherein like reference numerals refer to like elements throughout. In this regard, the exemplary embodiments may have different forms and should not be construed as being limited to the descriptions set forth herein. The exemplary embodiments are described below with reference to the figures. As used herein, the term "and/or" includes any and all combinations of one or more of the associated listed items.

The following descriptions and the accompanying drawings are for understanding operations according to the inventive concept, and descriptions of well-known features, which may be easily implemented by those of ordinary skill in the art, will be omitted for conciseness.

Also, the specification and the drawings are not intended to limit the scope of the inventive concept, and the scope of the inventive concept is to be defined by the appended claims. For the best understanding of the inventive concept, the terms used herein are to be interpreted as having meanings and concepts that are consistent with the inventive concept.

In the following exemplary embodiments, although terms such as "first" and "second" may be used herein to describe various elements or components, these elements or components should not be limited by these terms. These terms are only used to distinguish one element or component from another element or component.

The exemplary embodiments may be described in terms of functional block components and various processing operations. Such functional blocks may be implemented by any number of hardware and/or software components that execute particular functions. For example, the exemplary embodiments may employ various integrated circuit (IC) components, such as memory elements, processing elements, logic elements, and lookup tables, which may execute various functions under the control of one or more microprocessors or other control devices. Similarly, where the elements of the exemplary embodiments may be implemented by software programming or software elements, the exemplary embodiments may be implemented by any programming or scripting language such as C, C++, Java, or assembly language, with various algorithms being implemented by any combination of data structures, processes, routines, or other programming elements. Functional aspects may be implemented by an algorithm that is executed in one or more processors. Also, the exemplary embodiments may employ the related art for electronic environment setting, signal processing, and/or data processing. Terms such as "mechanism," "element," "unit," and "configuration" may be used in a broad sense, and are not limited to mechanical and physical configurations. The terms may include the meaning of software routines in conjunction with processors or the like.

Hereinafter, exemplary embodiments will be described in detail with reference to the accompanying drawings.

Figure 1:
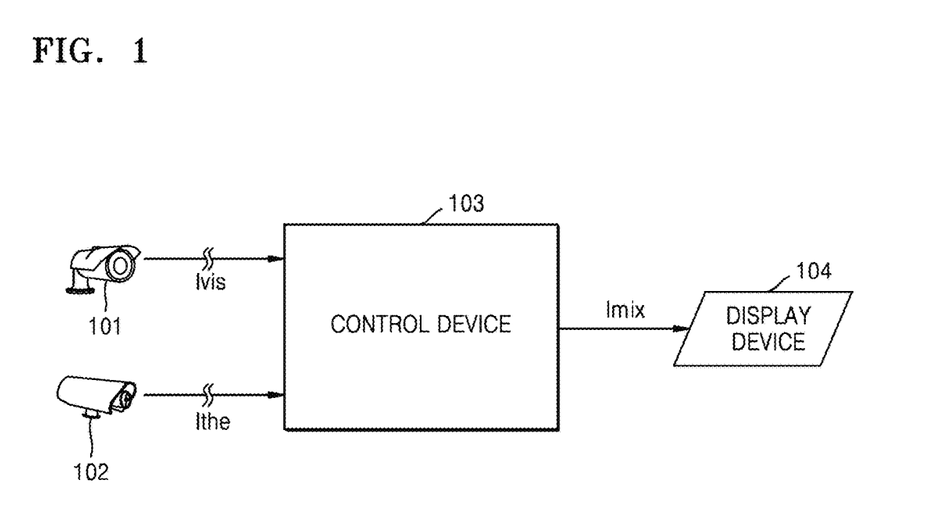
FIG. 1 illustrates a stereo camera system for setting an image registration algorithm according to an exemplary embodiment.

FIG. 1 illustrates a stereo camera system for setting an image registration algorithm according to an exemplary embodiment.

Referring to FIG. 1, in the stereo camera system, a first camera 101 and a second camera 102 may be cameras of the same property or different properties that provide image information by photographing the same scene. Images taken by such cameras may show different characteristics, e.g., different wavelength, of a subject. For example, the first camera 101 may capture a visible light image of the object and may output a visible light image Ivis. The second camera 102 may capture a thermal image of an object (subject) according to the temperature distribution of the object and may output a thermal image mage Ithe. The first camera 101 and the second camera 102 may have pan/tilt/zoom (PTZ) functions and may capture images of the same object at their respective zoom factors while panning and tilting together. Since a viewing angle (or a field of view (FOV)) of a camera is determined by a zoom factor, the zoom factor and the viewing angle are strongly interrelated. In other exemplary embodiment, each of the first camera 101 and the second camera 102 may include a fixed-focus lens or a zoom lens.

The camera system including the first camera 101 and the second camera 102 may be installed in an integrated manner inside many facilities requiring security, e.g., outside offices, houses, hospitals, banks, or public buildings, for access management or crime prevention by being installed in an integrated manner inside and/or outside offices, houses, hospitals, banks, or public buildings requiring security. The camera system may have various shapes, e.g., a linear shape or a dome shape, depending on their installation sites and purposes.

As aforementioned, the first camera 101 may be a visible-image camera for outputting the first image Ivis which is a visible image of an object, while the second camera 102 may be a thermal-image camera for outputting the second image Ithe which is a thermal image capturing the temperature distribution of the subject.

A control device 103 may perform registration and fusion on the first image Ivis from the first camera 101 and the second image Ithe from the second camera 102. The registration is a process of matching positional information of two or more images so as to arrange the images in a single coordinate system. The fusion is a process of adjusting the grayscales of original images of an image obtained by registering the original images.

Image registration may include a process of estimating a conversion model H based on feature points extracted from original images by matching corresponding feature points between the original images. The coordinates of some pixels in the original images may be converted using the conversion model H.

The conversion model H may be a matrix that represents the geometrical conversion relationship between two images. The conversion model H may be a two-dimensional (2D) homography matrix that represents the conversion relationship between two 2D plane images in a three-dimensional (3D) space as a 3×3 matrix defined by Equation (1) below.

$$H = \begin{pmatrix} h_{11} & h_{12} & h_{13} \\ h_{21} & h_{22} & h_{23} \\ h_{31} & h_{32} & h_{33} \end{pmatrix} \qquad (1)$$

Components h11 to h33 of the conversion model H may include rotation information representing rotation angles, translation information representing the translation amounts in x, y, and z directions, and scaling information representing the scaling amounts in the x, y, and z directions.

A registration method according to an exemplary embodiment will be described below in detail.

After processing registration, the control device 103 may perform rendering a result of the registration. In other words, the control device 103 may provide a result image Imix to a display device 104 or client terminals. Further, the control device 103 may store one or more of the first image Ivis, the second image Ithe, and the result image Imix in a storage, e.g., a memory.

Figure 2:
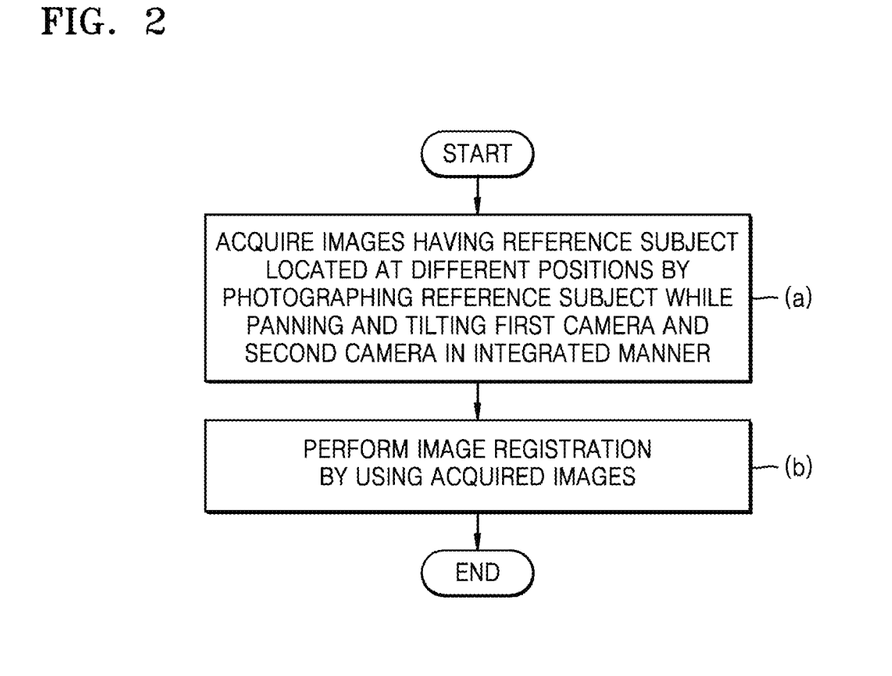
FIG. 2 is a flowchart schematically illustrating an image registration method according to an exemplary embodiment.

FIG. 2 is a flowchart schematically illustrating an image registration method according to an exemplary embodiment.

Figure 4:
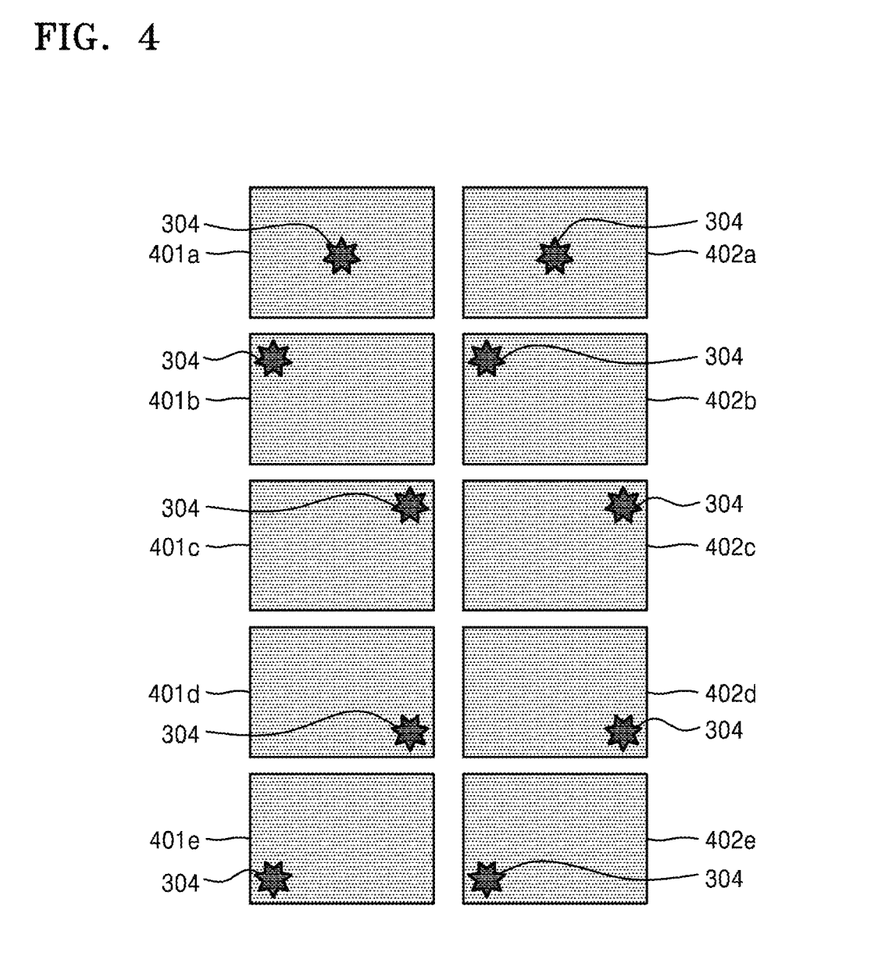
FIG. 4 illustrates feature point images according to an exemplary embodiment.

In operation (a), a first camera 101 and a second camera 102 in a stereo camera 301 capture source images for reference images, i.e., feature point images, e.g., images 401a to 401e and images 402a to 402e of FIG. 4, of a reference subject 304 located at different positions by photographing the reference subject 304 while panning and tilting in an integrated manner. The reference subject may be a single subject. The reference subject may be selected among a plurality of subjects in a captured image.

The control device 103 may obtain a panning and tilting control angle of the stereo camera 301. The panning and tilting control angle may be set such that the reference subject exists within a viewing angle of the first camera 101 and the second camera 102. Resolution conversion may be performed such that the first image Ivis and the second image Ithe have the same resolution. For example, the image captured at a large viewing angle, i.e., at a low zoom factor, may be cropped such that the resolution of the image captured at the large viewing angle is equal to the resolution of the image captured at a small viewing angle, i.e., at a high zoom factor.

For example, when the viewing angle of the first camera 101 is smaller than the viewing angle of the second camera 102, the control device 103 may calculate the panning and tilting control angle based on the viewing angle information of the first camera 101 and crop the second image Ithe such that the second image Ithe have the same resolution as the first image Ivis.

Figure 3:
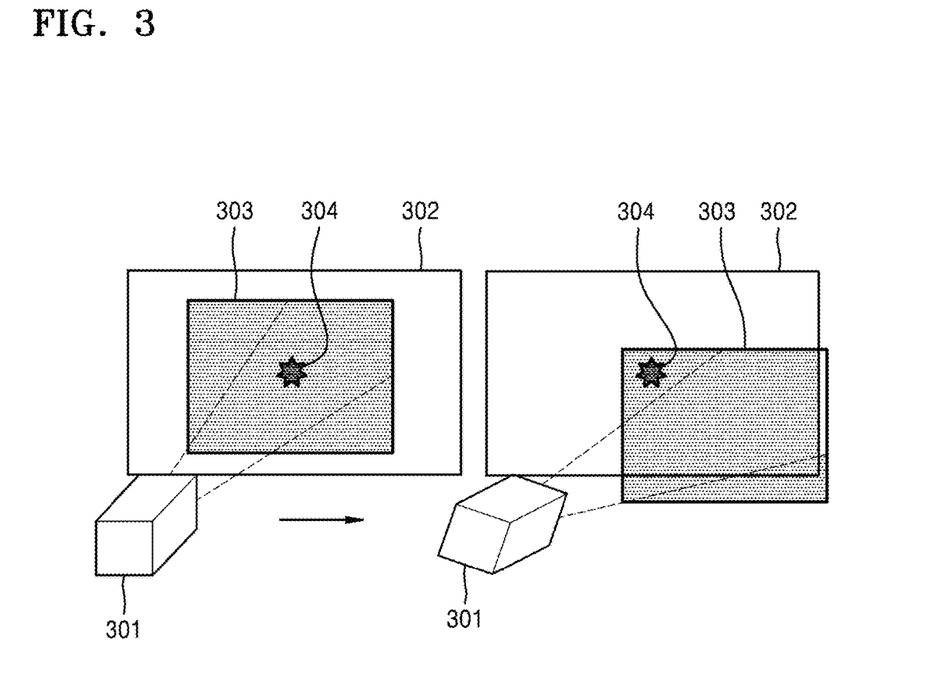
FIG. 3 illustrates a method of acquiring feature point images for reference images, according to an exemplary embodiment.

FIG. 3 illustrates a method of acquiring feature point images for reference images, i.e., operation (a) of FIG. 2, according to an exemplary embodiment. Referring to FIG. 3, in the stereo camera 301 performing a panning and tilting operation, a visible-image camera as the first camera 101 (see FIG. 1) and a thermal-image camera as the second camera 102 (see FIG. 1) are mounted in an integrated manner such that the first camera 101 and the second camera 102 move in unison. For example, the first camera 101 and the second camera 102 mounted on the stereo camera 301 may be disposed adjacent to each other and face the same direction. That is, the first camera 101 and the second camera 102 may be mounted on a structural member, maintaining a predetermined distance therebetween and having parallel optical axes. The structural member may be connected with a pan/tilt driving unit to pan and tilt the first camera 101 and the second camera 102 in an integrated manner.

In FIG. 3, a reference numeral "302" denotes a background region of the reference subject 304, and a reference numeral "303" denotes a photographing target region captured within a viewing angle. A black body source for camera correction may be used as the reference subject 304. As shown in FIG. 3, the stereo camera 301 photographs such that the reference subject 304 is located at a center of the image, and then photographs such that the reference subject 304 is located at a top left of the image by tilting downward and panning rightward.

FIG. 4 illustrates feature point images according to an exemplary embodiment. In FIG. 4, reference numerals "401a" to "401e" denote first feature point images captured from the first camera 101, and reference numerals "402a" to "402e" denote second feature point images captured from the second camera 102.

The center coordinates of the reference subject 304 in the feature point images may be used as the coordinates of feature points. By panning and tilting the stereo camera 301, the control device 103 may acquire the feature point images in which the reference subject 304 is located at different position. Referring to FIG. 4, a first image 401a and a second image 402a have the reference subject 304 at a center, a first image 401b and a second image 402b have the reference subject 304 at a top left, a first image 401c and a second image 402c have the reference subject 304 at a top right, a first image 401d and a second image 402d have the reference subject 304 at a bottom right, and a first image 401e and a second image 402e have the reference subject 304 at a bottom left. That is, in an exemplary embodiment of FIG. 4, the coordinates of five feature point may be acquired from the first feature point images and the second feature point images, respectively.

The number of feature point images acquired from each camera (101 or 102) may be adjusted depending on the number of feature points to be acquired. Also, the number of feature points depends on the positions of the reference subject 304, so the number of feature points may be adjusted by adjusting the panning and tilting control angle.

In order to get a more accurate registration algorithm, the control device 103 may zero the gradation of the background pixels except the reference subject 304 in the feature point images 401a to 401e and 402a to 402e. In other words, the control device 103 may mask regions outside the reference subject 304.

In operation (b), the control device 103 performs image registration by using the acquired feature point images 401a to 401e and 402a to 402e.

The image registration method according to the above exemplary embodiment may result in some advantageous effects. For example, the number and the position of reference subject 304 may be freely set. Further, a single reference subject may be flexibly chosen within the viewing angle and there is no need for a large-sized reference subject corresponding to the lowest zoom factor (i.e., the widest viewing angle).

Figure 5:
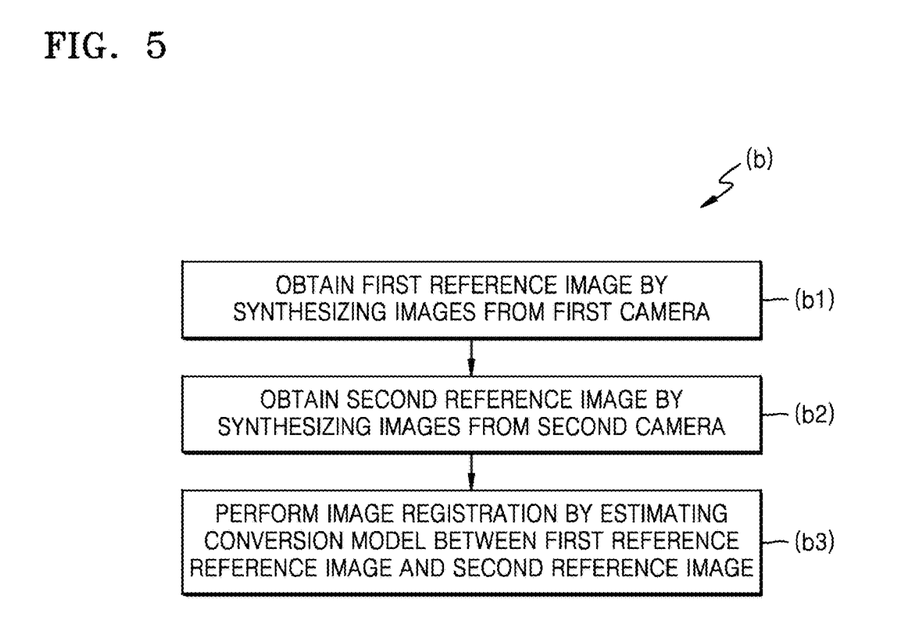
FIG. 5 is a flowchart illustrating a process of image registration according to an exemplary embodiment.
Figure 6:
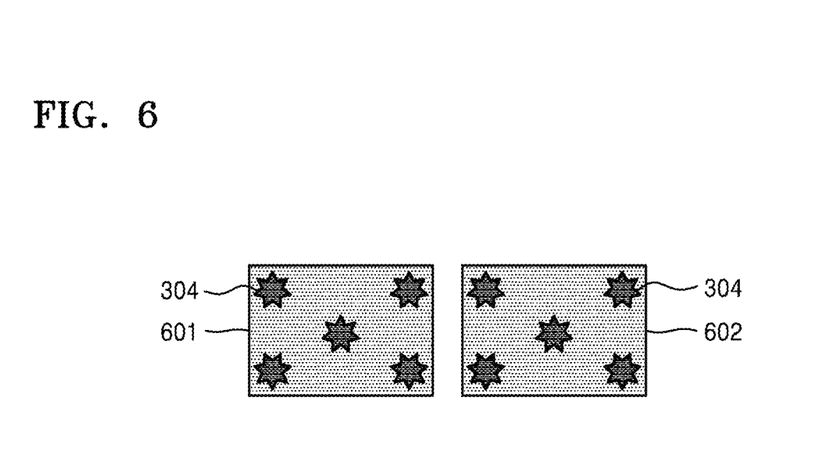
FIG. 6 illustrates reference images according to an exemplary embodiment.

FIG. 5 is a flowchart illustrating a process of image registration, i.e., operation (b) of FIG. 2, according to an exemplary embodiment. FIG. 6 illustrates reference images according to an exemplary embodiment. In FIG. 6, a reference numeral "304" denotes the reference subject, a reference numeral "601" denotes a first reference image, and a reference numeral "602" denotes a second reference image.

In operation (b1), the control device 103 may obtain the first reference image 601 by synthesizing the feature point images 401a to 401e, i.e., five feature point images.

In operation (b2), the control device 103 may obtain the second reference image 602 by synthesizing the images 402a to 402e, i.e., five feature point images.

In operation (b3), the control device 103 may perform image registration using the first reference image 601 and the second reference image 602. Further, the control device 103 may estimate a conversion model H by matching the corresponding feature points between the first reference image 601 and the second reference image 602.

Figure 7:
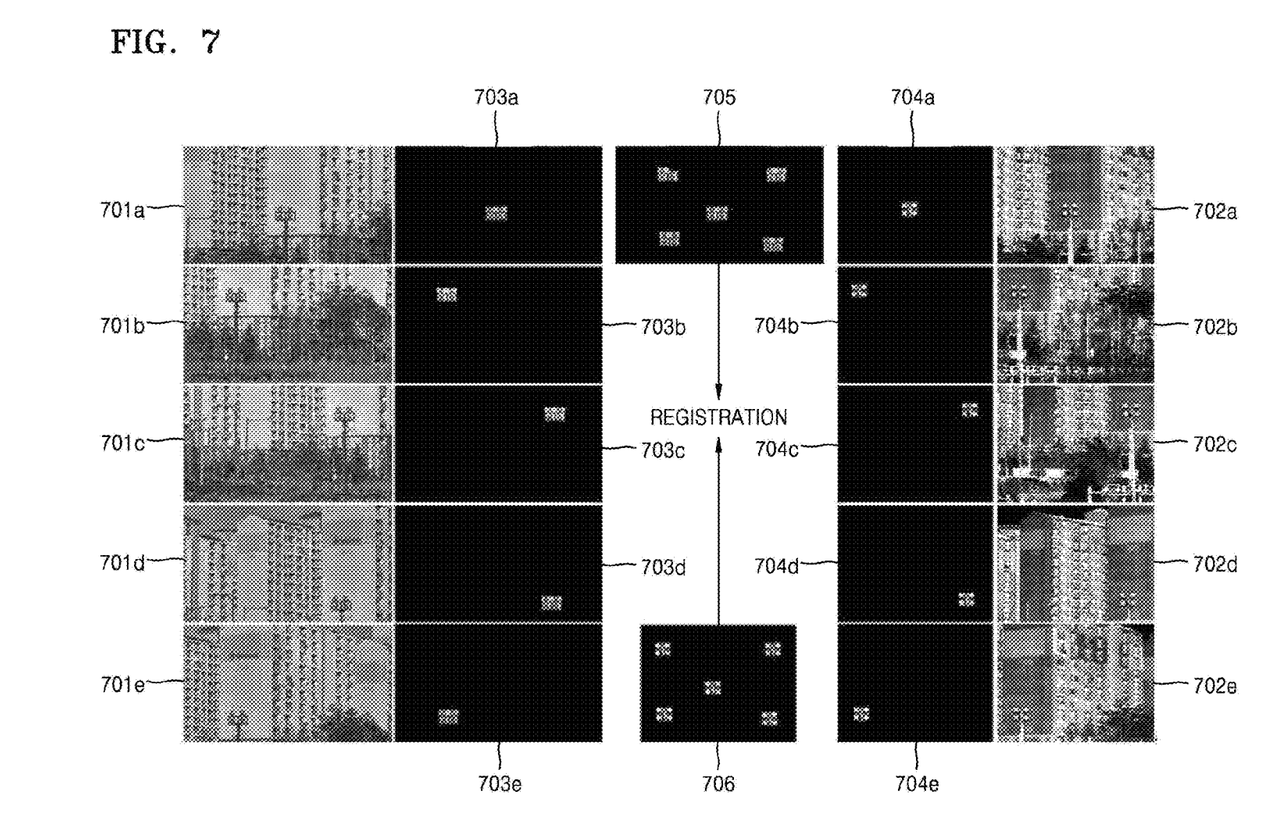
FIG. 7 is a diagram illustrating an image registration algorithm according to an exemplary embodiment.

FIG. 7 is a diagram illustrating an image registration algorithm according to an exemplary embodiment.

Referring to FIGS. 1 and 7, original images 701a to 701e captured from the first camera 101 are converted into first feature point images 703a to 703e by masking regions outside the reference subject. That is, the gradation of the pixels of the masked regions is zeroed.

Likewise, original images 702a to 702e captured from the second camera 102 are converted into second feature point images 704a to 704e by masking regions outside the reference subject. That is, the gradation of the pixels of the masked regions is zeroed.

Then, a first reference image 705 is obtained by synthesizing the first feature point images 703a to 703e.

Likewise, a second reference image 706 is obtained by synthesizing the second feature point images 704a to 704e.

Finally, image registration is performed with respect to the first reference image 705 and the second reference image 706 by estimating a conversion model H with respect to the first reference image 705 and the second reference image 706.

Figure 8:
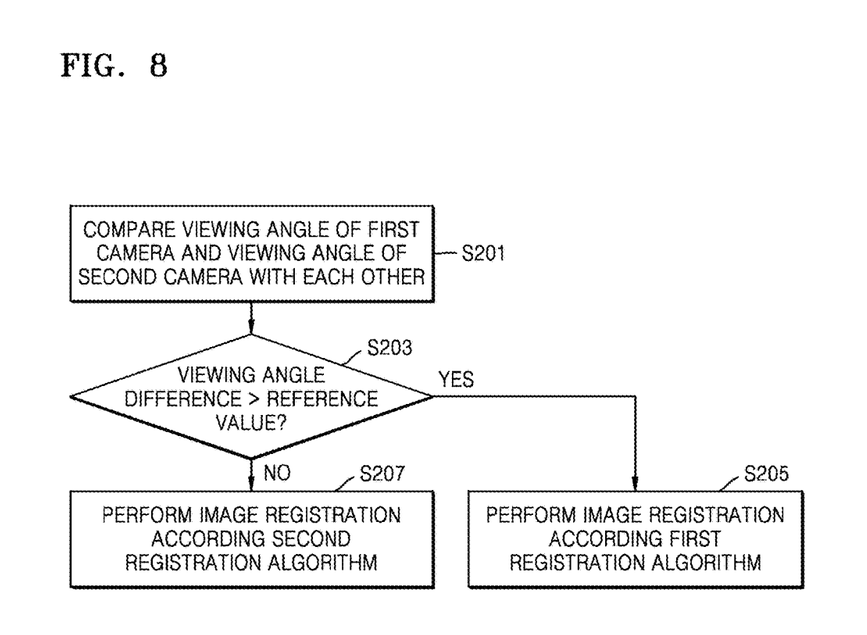
FIG. 8 is a flowchart illustrating an image registration method according to another exemplary embodiment.

FIG. 8 is a flowchart illustrating an image registration method according to another exemplary embodiment.

In operation S201, the control device 103 may compare the viewing angles of the first camera 101 with the second camera 102 in the stereo camera 301. The viewing angles of the first camera 101 and the second camera 102 may be horizontal, vertical, or diagonal.

In operation S203, it may be determined if the angle difference between the first camera 101 and the second camera 102 is greater than a reference value.

In operation S205, when the angle difference between the first camera 101 and the second camera 102 is greater than a reference value, the control device 103 may perform an image registration according to a first registration algorithm. The first registration algorithm may be the registration algorithm described above with reference to FIGS. 2 to 7. That is, the first registration algorithm estimates a conversion model by matching corresponding feature points between the first reference image generated from the first images Ivis and the second reference image generated from the second images Ithe, which are captured with respect to the reference subject. Then, the coordinates of pixels of one reference image may be converted using the conversion model.

In operation S207, when the viewing angle difference between the first camera 101 and the second camera 102 is less than or equal to the reference value, the control device 103 performs image registration according to a second registration algorithm. The second registration algorithm estimates a conversion model using a single first image Ivis and a single second image Ithe.

Thus, an exemplary embodiment of FIG. 8 may perform image registration flexibly by setting different image registration algorithms based on the viewing angle similarity between the cameras. For example, when the two cameras have significantly different zoom factors (i.e., different viewing angles), the first camera and the second camera may pan and tilt in an integrated manner to acquire a plurality of feature point images having the same reference subject (i.e., the feature point) located at different positions. Accurate image registration may be achieved using a reference image by synthesizing the acquired feature point images. Thus, accurate image registration may be performed according to an optimized algorithm whether or not the first camera and the second camera have different viewing angles.

Some exemplary embodiments described herein assume two cameras constituting the camera system of FIG. 1, but the number of cameras may be various in other exemplary embodiments and is not limited thereto.

Figure 9:
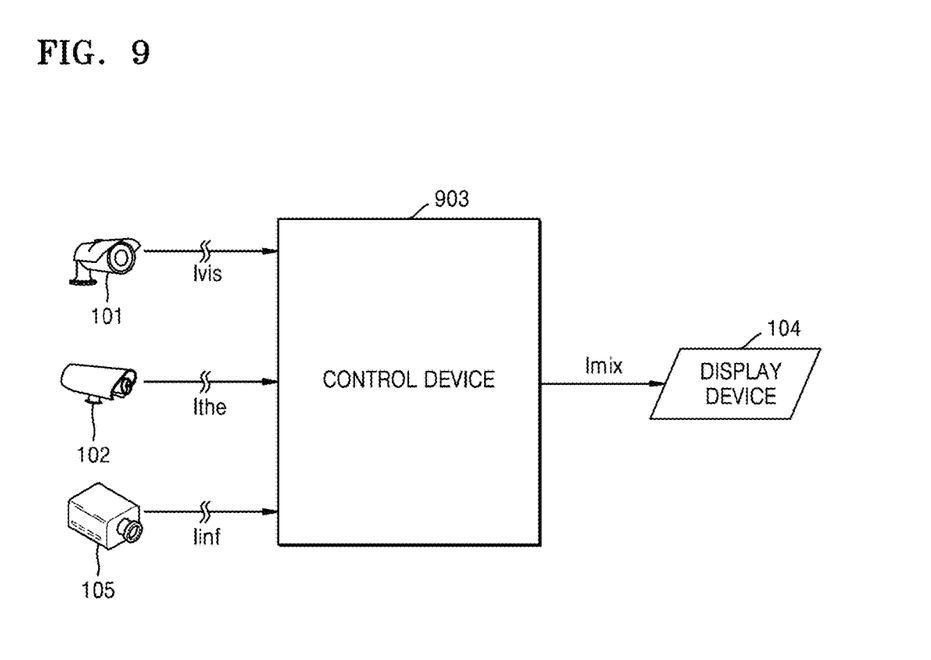
FIG. 9 illustrates a stereo camera system for performing an image registration method according to another exemplary embodiment.

FIG. 9 illustrates a stereo camera system for performing an image registration method according to another exemplary embodiment.

Referring to FIG. 9, the stereo camera system further includes a third camera 105 in addition to a first camera 101 and a second camera 102, in comparison with the stereo camera system of FIG. 1.

The cameras 101, 102, and 105 may be cameras of the same property or different properties that provide image information by photographing the same scene. The first to third cameras 101, 102, and 105 may have PTZ functions and may capture images of the same point at their respective zoom factors while panning and tilting together. Each of the cameras 101, 102, and 105 may include a fixed-focus lens or a zoom lens.

The first camera 101, e.g., a visible-image camera, may output a first image Ivis, e.g., a visible image of a reference subject. The second camera 102, e.g., a thermal-image camera, may output a second image Ithe, e.g., a thermal image of the subject. The third camera 105, e.g., an infrared-image camera mounted with an about 850 nm infrared illumination, may output a third image Iinf as an infrared image of the subject.

A control device 903 may perform registration and fusion by using at least two of the first image Ivis from the first camera 101, the second image Ithe from the second camera 102, and the third image Iinf from the third camera 105 as a reference image.

Since the registration algorithm selection and the image registration method have already been described with reference to FIGS. 1 to 8, descriptions thereof will not be repeated here.

Although FIGS. 1 and 9 illustrate cameras having different properties, exemplary embodiments are not limited thereto and cameras having the same property may be provided.

As described above, even when two or more cameras have different viewing angles, an exemplary embodiment may perform accurate image registration by panning and tilting the cameras equally, acquiring multiple feature point images of a single reference subject, and generating a reference image by synthesizing the feature point images.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An image registration method performed by a processor to register images taken by multiple cameras moving in a synchronized manner at same relative positions each other, the image registration method comprising:
   acquiring multiple sets of images of a reference subject, wherein
      an n-th camera takes an n-th set of images,
      each set of the multiple sets of images has more than one image, and
      in each set of the multiple sets of images, directions of the camera taking the images in the set are different each other;
   generating reference images respectively corresponding to the multiple sets of images by synthesizing images of each of the multiple sets of images;
   comparing a first field of view of a first camera with a second field of view of a second camera;
   performing image registration according to a first registration algorithm when a difference between the first field of view and the second field of view is greater than a reference value;
   performing image registration according to a second registration algorithm when the difference between the first field of view and the second field of view is less than or equal to the reference value; and
   rendering a result image showing a result of the image registration,
   wherein the first registration algorithm estimates a conversion model by matching corresponding feature points between first and second reference images, and
   wherein the second registration algorithm estimates the conversion model by matching corresponding feature points between the multiple sets of images without using the first and second reference images.

2. The image registration method of claim 1, wherein each of the multiple sets of images shows a different wavelength characteristic of the reference subject.

3. The image registration method of claim 1, wherein the generating the reference images comprises:
   generating feature point images by masking regions outside the reference subject in the multiple sets of images; and
   synthesizing the feature point images for each of the multiple sets of images.

4. The image registration method of claim 1, wherein a center coordinate of the reference subject in each reference image is used as a coordinate of a feature point of the reference image.

5. A camera system comprising:
   multiple cameras configured to move in a synchronized manner at same relative positions each other; and
   a controller configured to:
      acquire multiple sets of images of a reference subject, wherein
         an n-th camera takes an n-th set of images,
         each set of the multiple sets of images has more than one image, and
         in each set of the multiple sets of images, directions of the camera taking the images in the set are different each other, generate reference images respectively corresponding to the multiple sets of images by synthesizing images of each of the multiple sets of images, compare a first field of view of a first camera with a second field of view of a second camera, perform image registration according to a first registration algorithm when a difference between the first field of view and the second field of view is greater than a reference value, and perform image registration according to a second registration algorithm when the difference between the first field of view and the second field of view is less than or equal to the reference value, and perform rendering of a result image showing a result of the image registration, wherein the first registration algorithm estimates a conversion model by matching corresponding feature points between first and second reference images, and wherein the second registration algorithm estimates the conversion model by matching corresponding feature points between the multiple sets of images without using the first and second reference images.

6. The camera system of claim 5, wherein a center coordinate of the reference subject in each reference image is used as a coordinate of a feature point of the reference image.

7. The camera system of claim 5, wherein the controller is further configured to generate feature point images by masking regions outside the reference subject in the multiple sets of images, and synthesize images for each of the multiple sets of images.

8. The camera system of claim 5, wherein each of the multiple sets of images shows a different wavelength characteristic of the reference subject.

* * * * *